United States Patent
Pauli et al.

(10) Patent No.: US 7,675,215 B2
(45) Date of Patent: Mar. 9, 2010

(54) ELECTRICAL DRIVE UNIT

(75) Inventors: Stephan Pauli, Achem (DE); Paul Geubel, Baden-Baden (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 12/293,430

(22) PCT Filed: Aug. 1, 2007

(86) PCT No.: PCT/EP2007/057951

§ 371 (c)(1),
(2), (4) Date: Sep. 18, 2008

(87) PCT Pub. No.: WO2008/031672

PCT Pub. Date: Mar. 20, 2008

(65) Prior Publication Data

US 2009/0167105 A1 Jul. 2, 2009

(30) Foreign Application Priority Data

Sep. 15, 2006 (DE) ............... 10 2006 043 318

(51) Int. Cl.
*H02K 13/00* (2006.01)
(52) U.S. Cl. .................... 310/239; 310/71
(58) Field of Classification Search ........ 310/230, 310/232, 233, 239, 240, 71
See application file for complete search history.

(56) References Cited

U.S. PATENT DOCUMENTS

| 4,216,512 | A | | 8/1980 | Vidwans |
| 5,015,897 | A | * | 5/1991 | Inagaki et al. ............... 310/83 |
| 6,858,966 | B2 | * | 2/2005 | Kondo et al. ............... 310/232 |
| 2002/0047363 | A1 | * | 4/2002 | Kloeppel et al. ............... 310/71 |

FOREIGN PATENT DOCUMENTS

| DE | 2644509 A1 | 4/1977 |
| EP | 1523086 A | 4/2005 |
| FR | 2807889 A | 10/2001 |
| GB | 2173049 A | 10/1986 |
| JP | 57135652 A | 8/1982 |

OTHER PUBLICATIONS

PCT/EP2007/057951 International Search Report.

* cited by examiner

*Primary Examiner*—Nguyen N Hanh
(74) *Attorney, Agent, or Firm*—Michael Best & Friedrich LLP

(57) ABSTRACT

The present invention relates to an electrical drive unit with an electric motor and a transmission, wherein the motor has a rotor shaft (6), to which a rotor (10) and a commutator (11) are fitted in a manner fixed against rotation, wherein a commutator sliding contact (23) is provided in order to make contact with the commutator (11), and wherein an electrical connection is provided between an electrical terminal (18) and the commutator sliding contact (23). According to the invention, one cable and one special step in the manufacturing process are dispensed with by virtue of the fact that the electrical connection runs via the rotor shaft (6).

10 Claims, 1 Drawing Sheet

ELECTRICAL DRIVE UNIT

BACKGROUND OF THE INVENTION

The present invention relates to an electrical drive unit, in particular an electrical drive unit for a rear windshield wiper.

An electrical drive unit of this type comprises an electric motor and a gear mechanism, with the motor having a rotor shaft to which a rotor and a commutator are fitted in a rotationally fixed manner, with a commutator sliding contact being provided in order to make contact with the commutator, and with an electrical connection being provided between an electrical terminal and the commutator sliding contact. In this case, the electrical connection is in the form of a cable which connects a sliding contact to the at least one electrical terminal.

One disadvantage of the electrical connection being in the form of a cable is that an additional cable is required which has to be fitted in a special production step.

SUMMARY OF THE INVENTION

The present invention is based on the object of providing an electrical drive unit which requires few individual parts and accordingly can be assembled in a simple manner.

According to the invention, the electrical connection runs via the rotor shaft.

The existing rotor shaft can advantageously be used instead of an additional cable in order to establish the electrical connection between the electrical terminal and the commutator sliding contact.

In a preferred embodiment, a power supply line connects the electrical terminal to a rotor shaft sliding contact with which the rotor shaft makes contact.

A sliding contact is advantageously particularly suitable for making contact with a rotating rotor shaft.

In a development of the preferred embodiment, a further power supply line connects the commutator sliding contact to a further rotor shaft sliding contact.

An electrical connection between the commutator sliding contact and the rotor shaft can advantageously be established via a rotating shaft.

In a further development of the preferred embodiment, a power discharge line connects a further commutator sliding contact to the motor housing which is electrically conductive.

The existing motor housing can advantageously be used instead of an additional cable in order to establish an electrical connection between the further electrical terminal and the further commutator sliding contact.

In a further development of the preferred embodiment, the motor housing is connected to a gear mechanism housing which is electrically conductive.

Power can advantageously also flow from the motor housing to the gear mechanism housing.

In a further development of the preferred embodiment, a further power discharge line connects a further power terminal to the gear mechanism housing.

An electrical connection can advantageously be established from the further commutator sliding contact to the further electrical terminal.

BRIEF DESCRIPTION OF THE DRAWING

The invention is described in greater detail below with reference to the drawing, in which.

DETAILED DESCRIPTION

Figure 1:
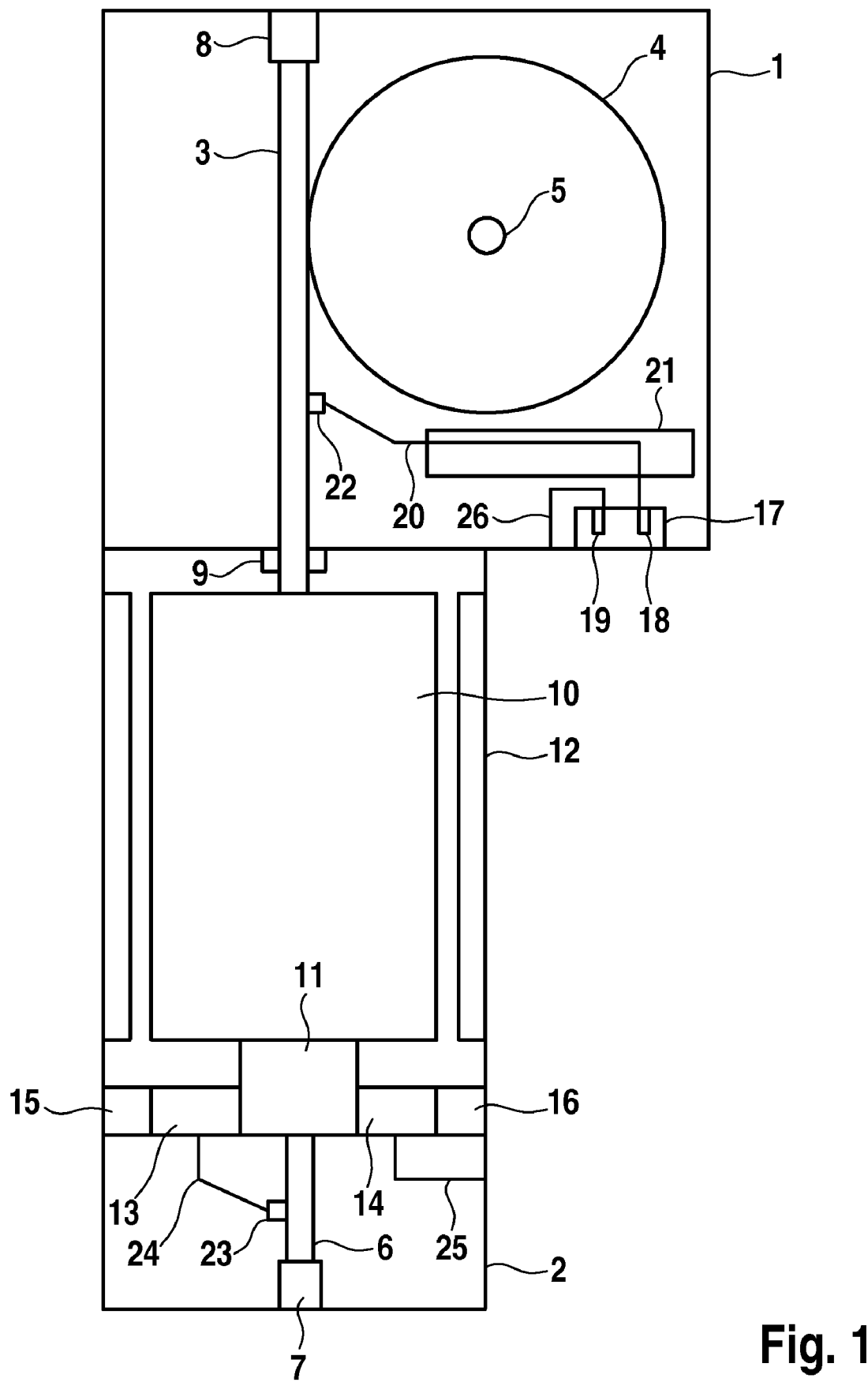
FIG. 1 shows a schematic view of the structure of an electrical drive unit.

FIG. 1 shows a schematic view of the structure of an electrical drive unit. The electrical drive unit comprises a gear mechanism, which is accommodated in a gear mechanism housing 1, and an electric motor which is accommodated in a motor housing 2. The gear mechanism housing 1 and the motor housing 2 are connected to one another, for example by means of screws. The gear mechanism housing 1 and the motor housing 2 are partially or completely composed of metal. The gear mechanism comprises a worm 3 into which a worm gear 4, which is firmly connected to a shaft 5, engages. The worm 3 is in the form of an extended portion of a rotor shaft 6 of the electric motor. The rotor shaft 6 is rotatably mounted in the bearings 7 and 8 at its two ends and is rotatably mounted in the bearing 9 at the transition from the motor housing 2 to the gear mechanism housing 1. The bearings 7, 8, 9 are electrically insulated, so that power cannot flow between the rotor shaft 6 and the motor housing 1 or the gear mechanism housing 2. The rotor shaft 6 comprises metal. A rotor 10 and a commutator 11 are fitted to the rotor shaft 6 in a rotationally fixed manner. The rotor 10 is surrounded by a stator 12 which is fixed to the motor housing 2. The commutator sliding contacts 13 and 14, which are held by the mounts 15 and, respectively, 16 and are pushed elastically against the commutator 11, for example by springs, make contact with the commutator 11. The commutator sliding contacts 13, 14 typically comprise carbon brushes.

An electrical socket 17 which has an electrical terminal 18 and a further electrical terminal 19 is fitted to the gear mechanism housing 1. The electrical terminal 18 is connected to a power supply line 20 which runs via an electrical printed circuit board 21. The electrical printed circuit board 21 may be populated by a switch, in order to interrupt the flow of power through the power supply line 20, and further components such as resistors, capacitors, transistors or a complete control electronics arrangement (not shown). The power supply line 20 is connected to a rotor shaft sliding contact 22 with which the rotor shaft 6 or the extension of the rotor shaft 6, that is to say the worm 3, makes contact. A further rotor shaft sliding contact 23, which is connected to the commutator sliding contact 13 via a further power supply line 24, makes contact with the rotor shaft 6. The rotor shaft sliding contacts 22, 23 preferably comprise carbon brushes and are pressed elastically against the rotor shaft 6. The contact-pressure force may be generated, for example, by the power supply lines 20, 24 being in the form of spring elements. Therefore, power can flow from the electrical terminal 18 to the commutator sliding contact 13, and from there through the rotor 10 to the further commutator sliding contact 14 in the conventional manner. The further commutator sliding contact 14 is connected to the motor housing 2 via a power discharge line 25. A further electrical terminal 19 is connected to the gear mechanism housing 1 via a further power discharge line 26, so that power can flow from the further commutator sliding contact 14 to the further electrical terminal 19.

As an alternative, the commutator may be provided on the side in the gear mechanism housing. In this case, it is not necessary to connect a power discharge line to the motor housing and conduct power via the motor housing.

It should be noted that the direction of power which is conventionally defined is not intended to be specified by the selection of the terms "power supply line" and "power discharge line", but rather is arbitrary. These two terms are used to distinguish between electrical lines which are situated upstream or downstream of the rotor 10. In order to take into account the conventional definition of the direction of power, these two terms could also be exchanged. However, in general, the further electrical terminal 19 is connected to ground, so that the motor housing 1 and the gear mechanism housing 2 are likewise connected to ground.

The invention claimed is:

1. An electrical drive unit comprising an electric motor and a gear mechanism, with the motor having a rotor shaft (6) to which a rotor (10) and a commutator (11) are fitted in a rotationally fixed manner, with a commutator sliding contact (23) being provided in order to make contact with the commutator (11), and with an electrical connection being provided between an electrical terminal (18) and the commutator sliding contact (23), characterized in that the electrical connection runs via the rotor shaft (6).

2. The electrical drive unit as claimed in claim 1, characterized in that a power supply line (20) connects the electrical terminal to a rotor shaft sliding contact (22) with which the rotor shaft (6) makes contact.

3. The electrical drive unit as claimed in claim 2, characterized in that a further power supply line (24) connects the commutator sliding contact (13) to a further rotor shaft sliding contact (23).

4. The electrical drive unit as claimed in claim 3, characterized in that a power discharge line (25) connects a further commutator sliding contact (14) to the motor housing (2) which is electrically conductive.

5. The electrical drive unit as claimed in claim 4, characterized in that the motor housing (2) is connected to a gear mechanism housing (1) which is electrically conductive.

6. The electrical drive unit as claimed in claim 5, characterized in that a further power discharge line (26) connects a further power terminal (19) to the gear mechanism housing (1).

7. The electrical drive unit as claimed in claim 2, characterized in that a power discharge line (25) connects a further commutator sliding contact (14) to the motor housing (2) which is electrically conductive.

8. The electrical drive unit as claimed in claim 7, characterized in that the motor housing (2) is connected to a gear mechanism housing (1) which is electrically conductive.

9. The electrical drive unit as claimed in claim 8, characterized in that a further power discharge line (26) connects a further power terminal (19) to the gear mechanism housing (1).

10. The electrical drive unit as claimed in claim 7, characterized in that a further power discharge line (26) connects a further power terminal (19) to the gear mechanism housing (1).

* * * * *